C. L. HARVEY.
RACK FOR LOOSE LEAF VOLUMES.
APPLICATION FILED JULY 19, 1920.
1,367,875.
Patented Feb. 8, 1921.
3 SHEETS—SHEET 2.
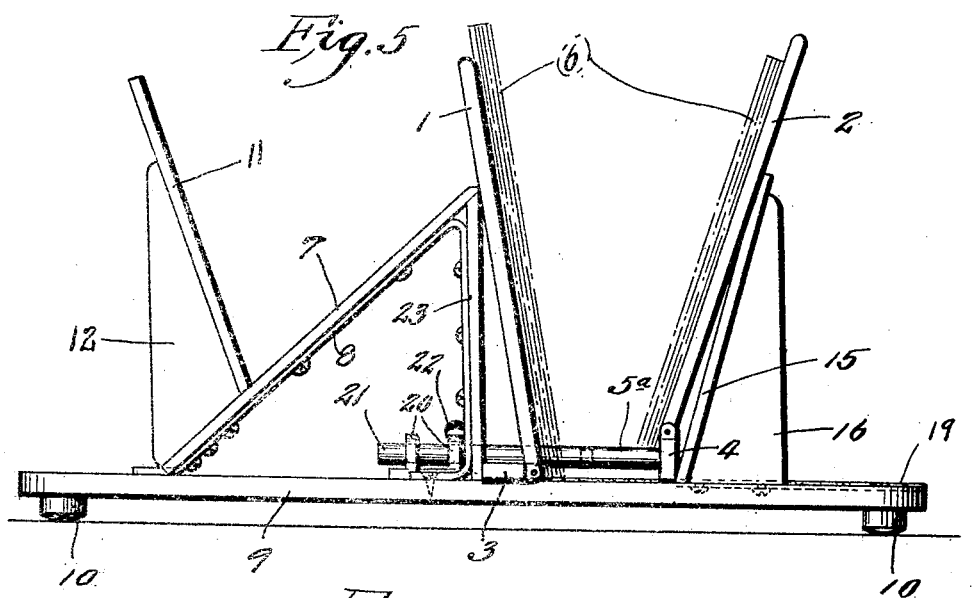
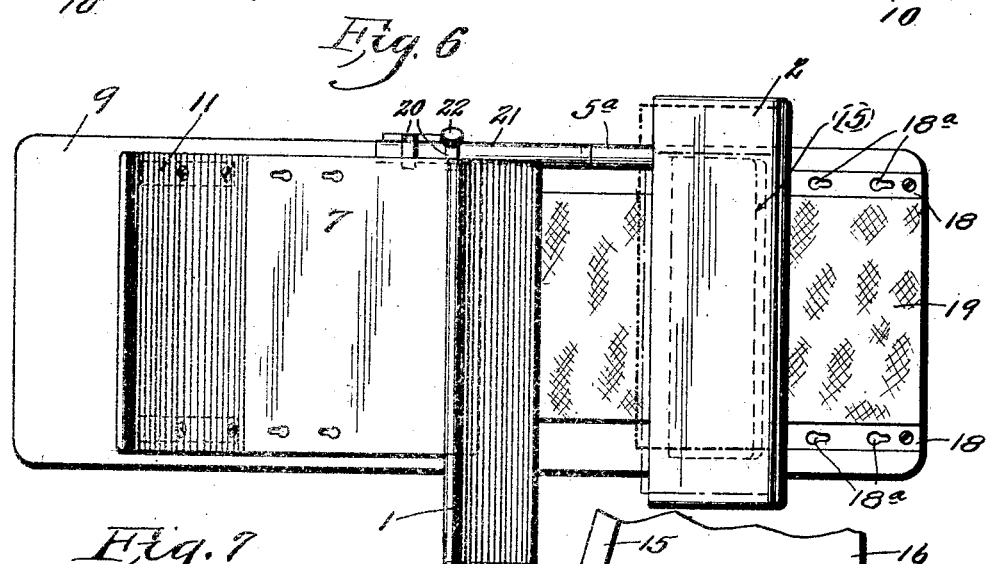
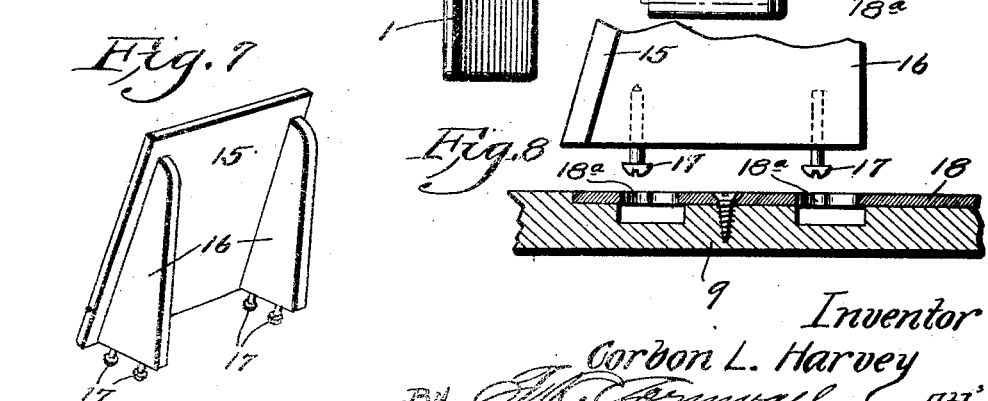
Inventor
Corbon L. Harvey

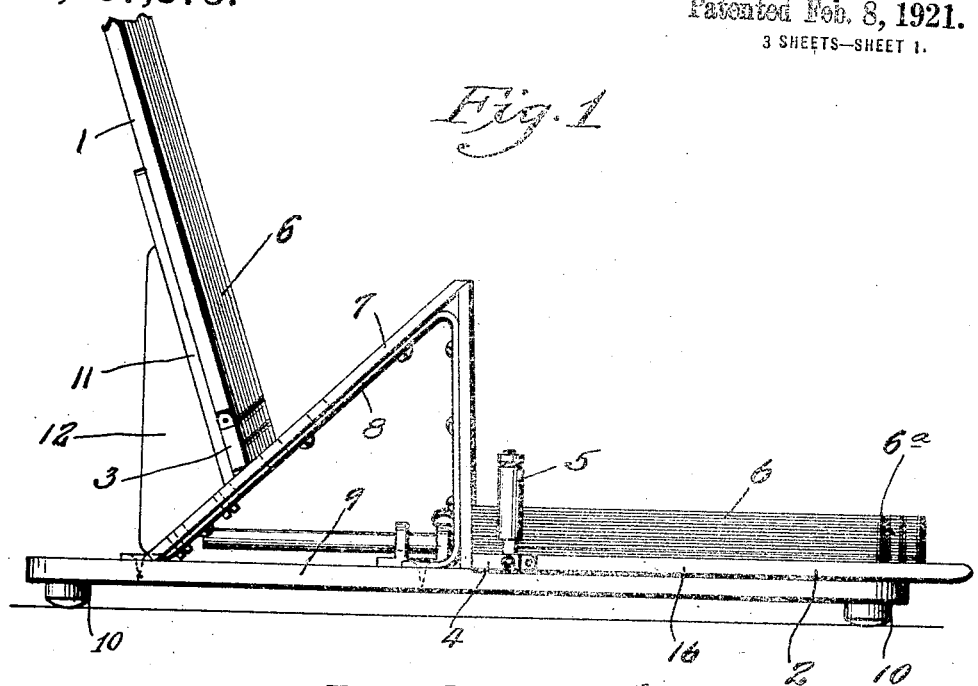
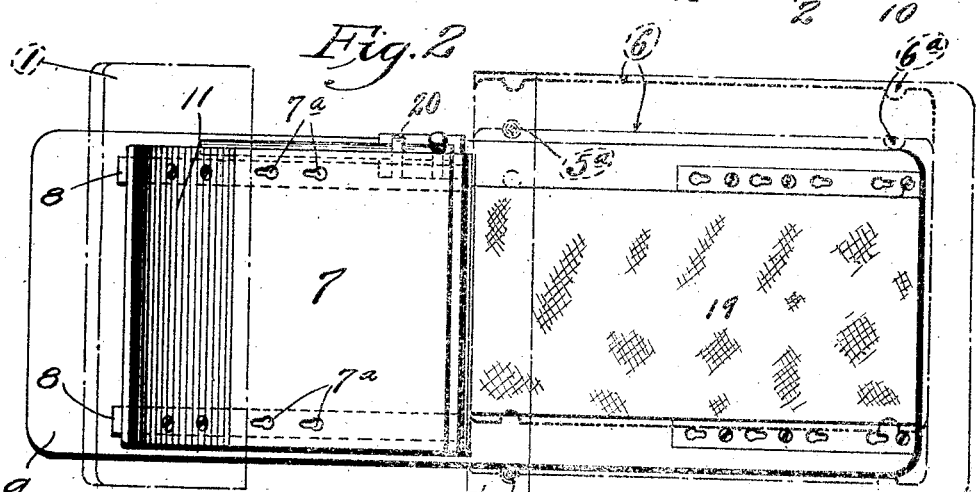
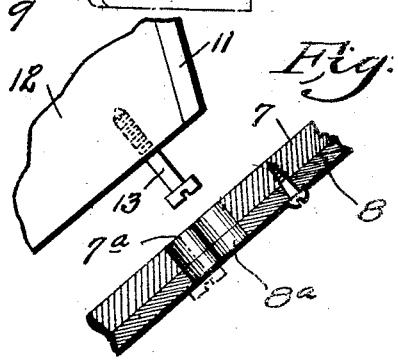
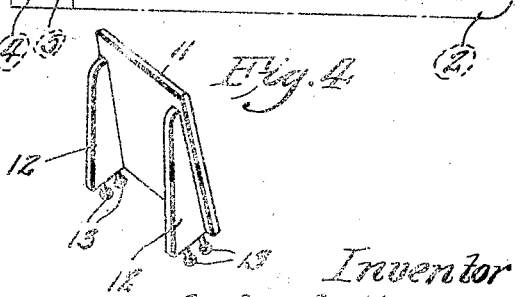

C. L. HARVEY.
RACK FOR LOOSE LEAF VOLUMES.
APPLICATION FILED JULY 19, 1920.

1,367,875.

Patented Feb. 8, 1921.

Inventor
Corbon L. Harvey
By [signature], Atty.

UNITED STATES PATENT OFFICE.

CORBON L. HARVEY, OF ST. LOUIS, MISSOURI.

RACK FOR LOOSE-LEAF VOLUMES.

1,367,875. Specification of Letters Patent. Patented Feb. 8, 1921.

Application filed July 19, 1920. Serial No. 397,413.

*To all whom it may concern:*

Be it known that I, CORBON L. HARVEY, a citizen of the United States, residing at St. Louis, Missouri, have invented a certain new and useful Improvement in Racks for Loose-Leaf Volumes, of which the following is a full, clear, and exact description, such as will enable others skilled in the art to which it appertains to make and use the same, reference being had to the accompanying drawings, forming part of this specification, in which—

Figure 1 is a side elevational view of my improved rack for loose leaf volumes showing the same adapted for one of its uses.

Fig. 2 is a top plan view of the rack shown in Fig. 1.

Fig. 3 is a sectional view showing the manner of adjustably arranging one of the supports in position.

Fig. 4 is a detail view of one of said supports.

Fig. 5 is a side elevational view of my improved rack showing the same adapted for use with a loose leaf volume in a different manner.

Fig. 6 is a top plan view of the rack shown in Fig. 5.

Fig. 7 is a detail view of one of the supports.

Fig. 8 is a detail view illustrating the manner of adjustably mounting the support in position.

Figure 9:
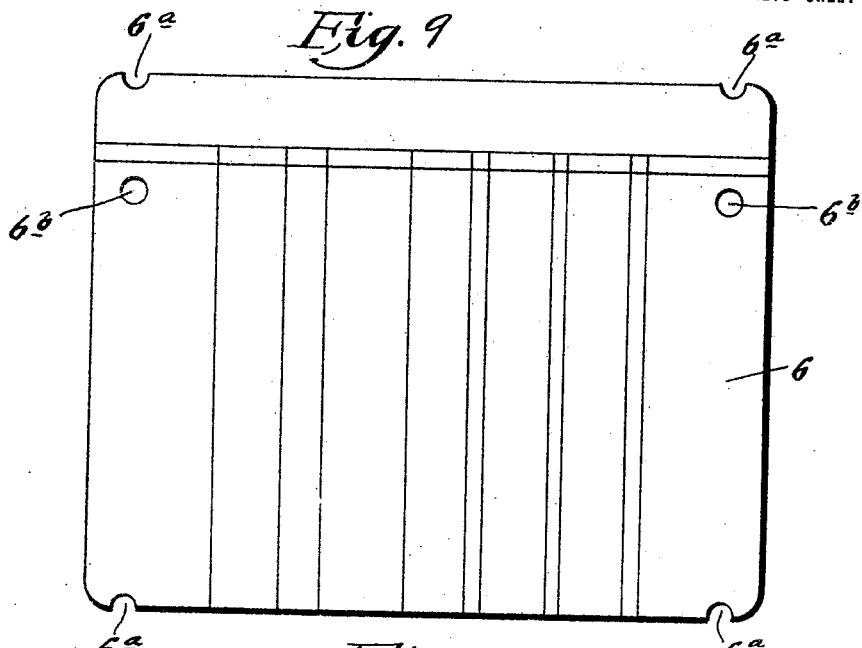
Fig. 9 is a view of a loose leaf designed for use in connection with a volume when the rack is used as shown in Fig. 1.

This invention relates to a new and useful improvement in racks for loose leaf volumes, such, for instance, as that disclosed in the companion application filed by me of even date herewith, and which volume consists of two covers 1 and 2, to which are hinged backing plates 3 and 4, respectively. The bottom backing plate 4 provides a mount for removable and extensible posts 5 and $5^a$. 6 are leaves of the volume which, as shown in Fig. 9, are provided with notches $6^a$ at their four corners, whereby said leaves may engage the posts 5 and $5^a$ and thus be held in position. There are two posts mounted on the backing plate 4, and these posts may be of the construction shown in my companion application aforesaid.

In the use of a loose leaf volume such, for instance, as illustrated in Fig. 1, in which the leaves shown in Fig. 9 are employed, the operator unlocks the top backing plate from the posts, as described in my companion application, and arranges the top cover with the leaves of the volume on an inclined support 7, preferably composed of wood, under which are a pair of straps 8. These straps 8 are secured to a table board 9, preferably having cushion legs 10 at its four corners. 11 indicates an adjustable bracket or support having wing portions 12 from which latter extend headed studs 13 which may be in the form of screws, as shown. The support 7 is provided with a plurality of keyhole openings $7^a$ which register with similar openings $8^a$ in the straps, and when the headed studs 13 are introduced first through the enlarged portions of the keyhole openings and then the bracket 11 is slipped downwardly on the inclined board 7, said bracket will be securely held in position. By making the bracket 11 adjustable, loose leaf volumes of various thicknesses can be accommodated on the support 7 without changing the angular position of said support relative to the adjustable bracket.

When the top cover 1 and the leaves 6 are arranged upon the support 7 and against the bracket 11, as shown in Fig. 1, the bottom cover 2 may be placed upon the extension of the table 9 to receive the leaves as they are lifted from the support 7 and placed in position on the cover 2 and between the posts 5 and $5^a$. If an entry is made on any particular leaf, such is done either by a pen, or on a typewriter, or on a billing machine, as the case may be, after which the leaf is placed in position on the cover 2 but offset relative to the other leaves on said cover, this offset being permitted by means of openings $6^b$ which receive the post $5^a$, as shown by the dot and dash lines in Fig. 2.

The covers 1 and 2 are made wider than the leaves, preferably at the top of the leaves, so that when any leaf, or leaves, are offset, such offset leaves will still be within the covers. These offset leaves indicate active accounts in which entries have been made, say, for instance, on the preceding date, or the same date. These active accounts may be referred to conveniently and in the order in which they appear in the volume. The inactive accounts may be left in their original position wherein the notches 6ª engage the posts 5 and 5ª.

Of course when the entries have been made in a volume, the top cover is arranged in position and locked to the posts 5 and 5ª, thus forming a complete volume with the offset leaves protected.

The extensible posts permit the introduction of new leaves, or, within certain limits, what is known as "stuffing," that is, the introduction of separate leaves, such as charge slips, invoices, or the like, between the leaves of a volume at proper places. To illustrate: If the volume is alphabetically arranged, or arranged by States or Territories, and the invoices are received in different order of arrangement, then the operator in order to save time in posting, can "stuff" the loose leaf volume, that is, distribute the invoices between the leaves at their proper places so that when the entries are made on the loose leaf, it may be removed for that purpose together with its invoices and when the entry is made, the leaf may be returned to position (offset, if desired), and the invoice separated therefrom.

According to the arrangement of my rack shown in Fig. 1, the leaves of the inactive accounts are turned over from the support 7 onto the bottom of the cover and between the posts 5 and 5ª. This is an adaptation of my improved rack to what might be termed a "Walkover" system, while in Fig. 2, I have shown the rack as adapted for use in connection with a vertical system. In this vertical system, there is preferably a separate bracket 15 employed, which bracket has wings 16 provided with headed studs 17 designed to coöperate with the keyhole openings 18ª in straps 18 countersunk in the table extension. Between these straps 18 is a facing fabric 19, preferably corduroy with its ribs extending transversely, which not only protects the bottom cover of the volume when used in the Walkover system, as shown in Fig. 1, but which serves to prevent the crumpling of the leaves between the covers when the rack is adapted for use in the vertical system.

Figure 11:
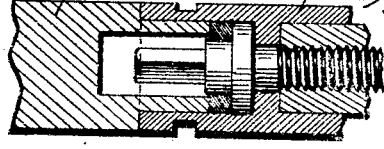
Fig. 11 is an enlarged view showing the manner of using the alining bar.

20 indicates lugs secured to the table 9, in which is slidingly mounted a pipe or rod 21. 22 indicates a set screw passing through one of the lugs for holding the rod in position. When the bracket 15—16 is properly adjusted in position for the size of volume in use, the top cover 1 is removed from the bottom cover and after folding the backing plate 3, as shown in Fig. 5, (which backing plate in this instance serves as a spacer and causes the top cover 1 to assume an angular position, its upper edge resting against a wall 23 secured to the vertical legs of the strap 8) the said top cover, together with the leaves, are arranged so as to be free from the back cover 2, which back cover, with its posts 5 and 5ª, is arranged against the bracket 15—16, as shown in Fig. 5. The alining rod 21 is now adjusted to engage the post 5ª (see Fig. 11), and this rod not only serves to hold the bottom cover 2 in position, but it also provides a means whereby any leaves to be offset may be mounted in proper alinement. To attain this latter end, the covers 1 and 2 are offset relative to each other, as shown in Fig. 6.

Figure 10:
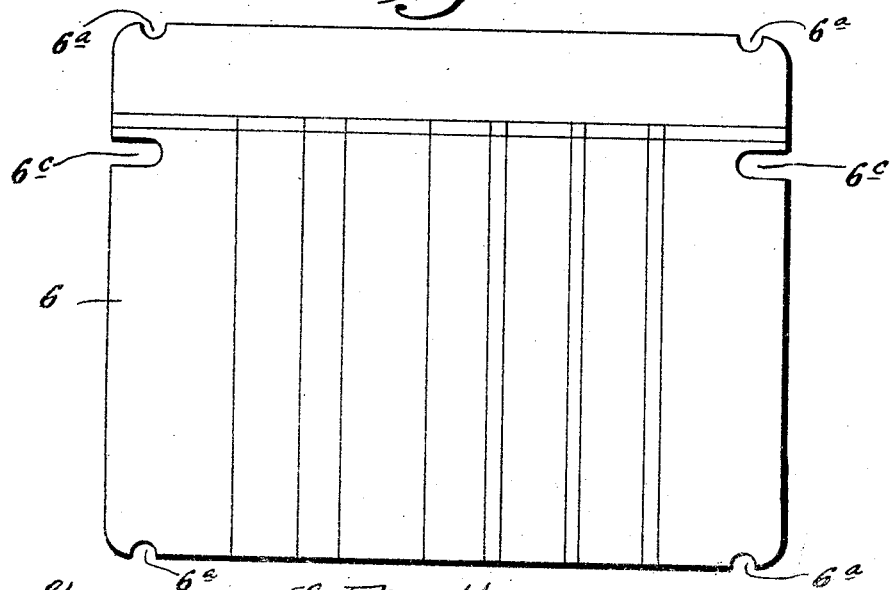
Fig. 10 is a plan view of a loose leaf from a volume when the rack is used as shown in Fig. 5.

While I have described my rack as if intended for use with loose leaf volumes having different kinds of leaves, such, for instance, as the locked offset leaf shown in Fig. 9, and the removable offset leaf shown in Fig. 10, it is obvious that if the removable offset leaf shown in Fig. 10 is employed, the device will lend itself readily to the placement of the invoices in their proper places in the volume, such, for instance, as shown in Fig. 5 wherein the "stuffed" volume will have all of the active accounts offset after posting and invoices in their proper places. The leaf shown in Fig. 10 will preferably be used in this operation, so that with leaves containing the active and inactive accounts, it is only necessary if it is desired to immediately post the invoices, or make other entries on the leaves relative to said invoices, to shift the leaves back to their original position, against the top cover 1, and lift said top cover, together with the leaves, and place it in the V-shaped support formed by the immovable frame 7—8 and the adjustable bracket 11—12. When this is done, the set screw 22 is loosened and the alining rod 21 moved back to its inactive position. This releases the bottom cover 2 which may now be lifted out to permit the removal of bracket 15—16, after which the bottom cover 2 is laid on the extension table.

In order to offset the leaves when the rack is used in the vertical system, I provide slots 6ᶜ which are designed to coöperate with the post 5ª, as shown by the dot and dash lines in Fig. 6, the remaining normally positioned, or leaves containing inactive accounts, being arranged with their upper edges against the post 5ª which alines them in position. In this vertical system, the post 5 is preferably entirely removed from the bottom backing plate.

What I claim is:

1. A rack for loose leaf volumes comprising a table, an inverted V-shaped support immovably secured to the table, and a bracket adjustably mounted on said inverted V-shaped support whereby, when said bracket is adjusted its angular relation to said support is preserved.

2. A rack for loose leaf volumes comprising a table, inverted V-shaped straps immovably secured to said table, a supporting board secured to said straps, and a bracket arranged above said supporting board and adjustably connected to said straps.

3. A rack for loose leaf volumes comprising a table, a V-shaped support one of whose legs is fixed, and the other of which is adjustably mounted relative to said fixed leg and a bracket adjustably mounted on an extension on the table and in line with said V-shaped supports said bracket being horizontally adjustable toward and from said supports.

4. A rack for loose leaf volumes comprising supports for the covers and leaves of the volumes, and a horizontally disposed alining rod adjustably mounted on said table for coöperating with one of the loose leaf covers.

5. A rack for loose leaf folders comprising a table, and removable cover and leaf supports adjustably mounted relative to each other, and means for locking said removable supports in their adjusted position.

6. A rack for loose leaf volumes comprising a table, a V-shaped support arranged above said table, one of whose legs is fixed, means for adjusting the other of the legs of said V-shaped support upon said fixed leg, and another removable bracket adjustably mounted on the table, said bracket being adjustable toward and from the fixed leg above mentioned.

7. A rack for loose leaf volumes comprising a table having an inverted V-shaped frame immovably secured thereto and extending thereabove, an adjustable bracket mounted on one of said frame members and another bracket mounted on the table and being adjustable relative to the other of said frame members.

8. A rack for loose leaf volumes comprising a table, an inverted V-shaped frame immovably secured to said table and extending thereabove, a bracket mounted upon one leg of said V-shaped frame, means for adjustably securing said bracket in position, another bracket mounted on the table, and means for adjustably mounting said last named bracket so that its position may be changed relative to the other of said frame members, and a fabric covering for that portion of the table on which said last mentioned bracket is mounted.

9. A rack for loose leaf volumes comprising a plurality of supports for the covers of the volume, and a horizontally disposed rod for engaging one of the volume covers to hold the same in position and serve as an alining medium for the leaves.

10. A rack for loose leaf volumes comprising a plurality of supports for the covers of the volume, adjustable means for engaging one of the volume covers to hold the same in position and serve as an alining medium for the leaves, said adjustable means being in the form of a horizontally disposed rod slidingly mounted in bearings on the table whereby it may be moved into and out of operative position, and means for locking said rod in its adjusted position.

In testimony whereof I hereunto affix my signature this 12th day of July, 1920.

CORBON L. HARVEY.